US012563194B2

(12) United States Patent
Liu et al.

(10) Patent No.: US 12,563,194 B2
(45) Date of Patent: *Feb. 24, 2026

(54) SUB-BLOCK TRANSFORM IN TRANSFORM SKIP MODE

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Jizheng Xu, San Diego, CA (US); Weijia Zhu, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 211 days.

This patent is subject to a terminal disclaimer.

(21) Appl. No.: 17/473,366

(22) Filed: Sep. 13, 2021

(65) Prior Publication Data

US 2022/0030240 A1     Jan. 27, 2022

Related U.S. Application Data

(63) Continuation of application No. PCT/CN2020/079245, filed on Mar. 13, 2020.

(30) Foreign Application Priority Data

Mar. 13, 2019     (WO) ................ PCT/CN2019/077942
Apr. 12, 2019     (WO) ................ PCT/CN2019/082428

(51) Int. Cl.
*H04N 19/50*          (2014.01)
*H04N 19/105*        (2014.01)
(Continued)

(52) U.S. Cl.
CPC ......... *H04N 19/122* (2014.11); *H04N 19/105* (2014.11); *H04N 19/119* (2014.11);
(Continued)

(58) Field of Classification Search
CPC .. H04N 19/122; H04N 19/105; H04N 19/119; H04N 19/13; H04N 19/14;
(Continued)

(56) References Cited

U.S. PATENT DOCUMENTS 9,215,470 B2     12/2015   Karczewicz et al.
9,451,254 B2 *    9/2016   Joshi ...................... H04N 19/70
(Continued)

FOREIGN PATENT DOCUMENTS

CN          104272735 A          1/2015
CN          109328461 A          2/2019
(Continued)

OTHER PUBLICATIONS

ITU-T, H.265 (Year: 2016).*
(Continued)

*Primary Examiner* — Philip P. Dang
(74) *Attorney, Agent, or Firm* — Conley Rose, P.C.

(57)     ABSTRACT

A method for video processing includes determining, based on a first indication, whether a sub-block residual coding scheme is applied to residual of a current video block in a transform skip mode, the sub-block residual coding scheme splitting the residual of the current video block into multiple sub-blocks and a subset of the multiple sub-blocks have non-zero coefficients; determining, based on a second indication, a specific split pattern to be applied to the residual of the current video block, in response to the sub-block residual coding scheme being applied to the residual of the current video block; deriving, based on a third indication, the subset of the multiple sub-blocks which have non-zero coefficients;
(Continued)

500 determining, based on a first indication, whether a sub-block residual coding scheme is applied to residual of a current video block in a transform skip mode, wherein the sub-block residual coding scheme splits the residual of the current video block into multiple sub-blocks and a subset of the multiple sub-blocks have non-zero coefficients — 502 determining, based on a second indication, a specific split pattern to be applied to the residual of the current video block, in response to the sub-block residual coding scheme being applied to the residual of the current video block — 504 deriving, based on a third indication, the subset of the multiple sub-blocks which have non-zero coefficients — 506 performing a conversion on the residue of the current video block based on the determined subset of sub-blocks having non-zero coefficients. — 508 and performing a conversion on the residue of the current video block based on the determined subset of sub-blocks having non-zero coefficients.

18 Claims, 6 Drawing Sheets

(51) Int. Cl.

| | |
|---|---|
| *H04N 19/119* | (2014.01) |
| *H04N 19/122* | (2014.01) |
| *H04N 19/13* | (2014.01) |
| *H04N 19/14* | (2014.01) |
| *H04N 19/157* | (2014.01) |
| *H04N 19/176* | (2014.01) |
| *H04N 19/60* | (2014.01) |
| *H04N 19/70* | (2014.01) |

(52) U.S. Cl.
CPC ............. *H04N 19/13* (2014.11); *H04N 19/14* (2014.11); *H04N 19/157* (2014.11); *H04N 19/176* (2014.11); *H04N 19/60* (2014.11); *H04N 19/70* (2014.11)

(58) Field of Classification Search
CPC .... H04N 19/157; H04N 19/176; H04N 19/60; H04N 19/70; H04N 19/96
See application file for complete search history.

(56) References Cited

U.S. PATENT DOCUMENTS

| | | | | |
|---|---|---|---|---|
| 9,628,795 | B2 | 4/2017 | Zhang et al. | |
| 9,736,454 | B2 * | 8/2017 | Hannuksela | H04N 19/597 |
| 9,756,336 | B2 | 9/2017 | Zhang et al. | |
| 9,787,990 | B2 * | 10/2017 | Gokhale | H04N 19/124 |
| 9,819,965 | B2 * | 11/2017 | Puri | H04N 19/119 |
| 9,883,198 | B2 * | 1/2018 | Puri | H04N 19/82 |
| 9,906,813 | B2 | 2/2018 | Zhang et al. | |
| 10,165,252 | B2 | 12/2018 | An et al. | |
| 10,230,980 | B2 | 3/2019 | Liu et al. | |
| 10,257,539 | B2 | 4/2019 | An et al. | |
| 10,271,048 | B2 | 4/2019 | Zhang et al. | |
| 10,334,281 | B2 | 6/2019 | Zhang et al. | |
| 10,390,044 | B2 | 8/2019 | Karczewicz et al. | |
| 10,404,988 | B2 | 9/2019 | Ye et al. | |
| 10,491,922 | B2 * | 11/2019 | Zhao | H04N 19/12 |
| 10,587,859 | B2 | 3/2020 | An et al. | |
| 10,609,423 | B2 | 3/2020 | Chuang et al. | |
| 10,666,948 | B2 * | 5/2020 | Rosewarne | H04N 19/19 |
| 10,701,358 | B2 * | 6/2020 | Zhao | H04N 19/91 |
| 10,721,489 | B2 * | 7/2020 | Chen | H04N 19/139 |
| 10,728,557 | B2 * | 7/2020 | Sarwer | H03M 7/42 |
| 10,743,027 | B2 * | 8/2020 | Zheng | H04N 19/122 |
| 10,750,182 | B2 * | 8/2020 | Cheong | H04N 19/146 |
| 10,771,811 | B2 | 9/2020 | Liu et al. | |
| 10,798,382 | B2 * | 10/2020 | Zhao | H04N 19/64 |
| 10,798,419 | B2 * | 10/2020 | Cheong | H04N 19/176 |
| 10,812,806 | B2 | 10/2020 | Zhang et al. | |
| 10,904,580 | B2 * | 1/2021 | Huang | H04N 19/174 |
| 10,904,581 | B2 * | 1/2021 | Lee | H04N 19/96 |
| 10,911,761 | B2 * | 2/2021 | Chen | H04N 19/533 |
| 10,939,107 | B2 * | 3/2021 | Sarwer | H04N 19/13 |
| 11,032,542 | B2 * | 6/2021 | Bordes | H04N 19/196 |
| 11,044,471 | B2 * | 6/2021 | Lee | H04N 19/176 |
| 11,082,708 | B2 * | 8/2021 | Zhang | H04N 19/159 |
| 11,218,704 | B2 * | 1/2022 | Lim | H04N 19/11 |
| 11,290,715 | B2 * | 3/2022 | Lim | H04N 19/82 |
| 11,323,705 | B2 * | 5/2022 | Lee | H04N 19/117 |
| 11,350,107 | B2 * | 5/2022 | Jun | H04N 19/593 |
| 11,368,722 | B2 * | 6/2022 | Lee | H04N 19/105 |
| 11,375,185 | B2 * | 6/2022 | Lee | H04N 19/176 |
| 11,375,191 | B2 * | 6/2022 | Thoreau | H04N 19/12 |
| 11,445,186 | B2 * | 9/2022 | Lee | H04N 19/91 |
| 11,445,215 | B2 * | 9/2022 | Lee | H04N 19/55 |
| 11,509,907 | B2 * | 11/2022 | Jun | H04N 19/176 |
| 11,563,954 | B2 * | 1/2023 | Jun | H04N 19/119 |
| 11,616,976 | B2 * | 3/2023 | Lim | H04N 19/523 |
| | | | | 375/240.03 |
| 11,677,940 | B2 * | 6/2023 | Lim | H04N 19/186 |
| | | | | 375/240.02 |
| 11,743,456 | B2 * | 8/2023 | Lee | G06T 9/004 |
| | | | | 375/240.02 |
| 11,805,256 | B2 * | 10/2023 | Lim | H04N 19/64 |
| 11,831,910 | B2 * | 11/2023 | Ko | H04N 19/105 |
| 12,126,802 | B2 | 10/2024 | Liu et al. | |
| 2013/0343455 | A1 * | 12/2013 | Yamamoto | H04N 19/122 |
| | | | | 375/240.03 |
| 2014/0301463 | A1 * | 10/2014 | Rusanovskyy | H04N 19/52 |
| | | | | 375/240.16 |
| 2016/0286232 | A1 | 9/2016 | Li et al. | |
| 2017/0280161 | A1 | 9/2017 | Cai et al. | |
| 2018/0014017 | A1 | 1/2018 | Li et al. | |
| 2018/0103252 | A1 | 4/2018 | Hsieh et al. | |
| 2018/0192072 | A1 | 7/2018 | Chen et al. | |
| 2018/0352226 | A1 | 12/2018 | An et al. | |
| 2019/0149821 | A1 | 5/2019 | Moon et al. | |
| 2019/0222865 | A1 | 7/2019 | Zhang et al. | |
| 2019/0306502 | A1 | 10/2019 | Gadde et al. | |
| 2019/0364278 | A1 * | 11/2019 | Lee | H04N 19/174 |
| 2020/0045336 | A1 | 2/2020 | Xiu et al. | |
| 2020/0120336 | A1 * | 4/2020 | Racape | H04N 19/91 |
| 2020/0195920 | A1 * | 6/2020 | Racape | H04N 19/70 |
| 2020/0236362 | A1 * | 7/2020 | Lee | H04N 19/52 |
| 2020/0267418 | A1 | 8/2020 | Chuang et al. | |
| 2020/0336738 | A1 | 10/2020 | Xiu et al. | |
| 2020/0374543 | A1 | 11/2020 | Liu et al. | |
| 2021/0006790 | A1 | 1/2021 | Zhang et al. | |
| 2021/0006803 | A1 | 1/2021 | Zhang et al. | |
| 2021/0014488 | A1 * | 1/2021 | Ko | H04N 19/14 |
| 2021/0029356 | A1 | 1/2021 | Zhang et al. | |
| 2021/0029368 | A1 | 1/2021 | Zhang et al. | |
| 2021/0076050 | A1 | 3/2021 | Zhang et al. | |
| 2021/0092436 | A1 | 3/2021 | Zhang et al. | |
| 2021/0136364 | A1 * | 5/2021 | Ko | H04N 19/70 |
| 2022/0007057 | A1 | 1/2022 | Liu et al. | |

FOREIGN PATENT DOCUMENTS

| | | | | |
|---|---|---|---|---|
| CN | 113632493 | B | 7/2024 | |
| DE | 60036288 | T2 * | 5/2008 | H04N 9/8042 |
| EP | 2574056 | A2 | 3/2013 | |
| EP | 2866443 | A1 | 4/2015 | |
| EP | 2652954 | B1 | 3/2016 | |
| JP | 2013187869 | A | 9/2013 | |
| WO | 2010131903 | A2 | 11/2010 | |
| WO | 2011071342 | A2 | 6/2011 | |
| WO | 2011074919 | A2 | 6/2011 | |
| WO | 2018026118 | A1 | 2/2018 | |
| WO | 2018045332 | A1 | 3/2018 | |
| WO | 2019027200 | A1 | 2/2019 | |

OTHER PUBLICATIONS

JVET-M0140 (Year: 2019).*
JVET-M0501 (Year: 2019).*
Bross et al. ""Versatile Video Coding (Draft 4), "" Joint Video Experts Team (JVET)of ITU-T SG 16 WP 3 and ISO/IEC JTC 1/SC 29/WG 1113th Meeting: Marrakech, MA, Jan. 9-18, 2019, document JVET-M1001, 2019.
Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
"Information Technology—High Efficiency Coding and Media Delivery in Heterogeneous Environments—Part 2: High Efficiency Video Coding" Apr. 20, 2018, ISO/DIS 23008, 4th Edition.
Rosewarne et al. "High Efficiency Video Coding (HEVC) Test Model 16 (HM 16) Improved Encoder Description Update 7," Joint Collaborative Team on Video Coding (JCT-VC) ITU-T SG 16 WP3

(56)        References Cited

OTHER PUBLICATIONS and ISO/IEC JTC1/SC29/WG11, 25th Meeting, Chengdu, CN, Oct. 14-21, 2016, document JCTVC-Y1002, 2016.

Tsukuba et al. ""EE2.7-related: On Secondary Transform When Primary Transform is Skipped,"" Joint Video Exploration Team (JVET)of ITU-T SG 16 WP 3 and ISO/IEC JTC 1/SC 29/WG 113rd Meeting: Geneva, CH, May 26-Jun. 1, 2016, document JVET-C0045, 2016.

Zhao et al. ""CE6: Sub-block transform for inter blocks (Test 6.4.1), "" Joint Video Experts Team (JVET)of ITU-T SG 16 WP 3 and ISO/IEC JTC 1/SC 29/WG 1113th Meeting: Marrakech, MA, Jan. 9-18, 2019, document JVET-M0140, 2019.

Zhao et al. ""CE6 related: Unification of Transform Skip Mode and MTS,"" Joint Video Experts Team (JVET)of ITU-T SG 16 WP 3 and ISO/IEC JTC 1/SC 29/WG 1113th Meeting: Marrakech, MA, Jan. 9-18, 2019, document JVET-M0501, 2019.

JEM-7.0: https://jvet.hhi.fraunhofer.de/svn/svn_HMJEMSoftware/tags/ HM-16.6-JEM-7.0.

https://vcgit.hhi.fraunhofer.de/jvet/VVCSoftware_VTM/tags/VTM-4.0.

International Search Report and Written Opinion from PCT/CN2020/079235 dated Jun. 16, 2020 (10 pages).

International Search Report and Written Opinion from PCT/CN2020/079245 dated Jun. 16, 2020 (10 pages).

Non-Final Office Action from U.S. Appl. No. 17/473,440 dated Aug. 30, 2023.

* cited by examiner

400

402 Processor

404 Memory

Video processing Circuitry

406

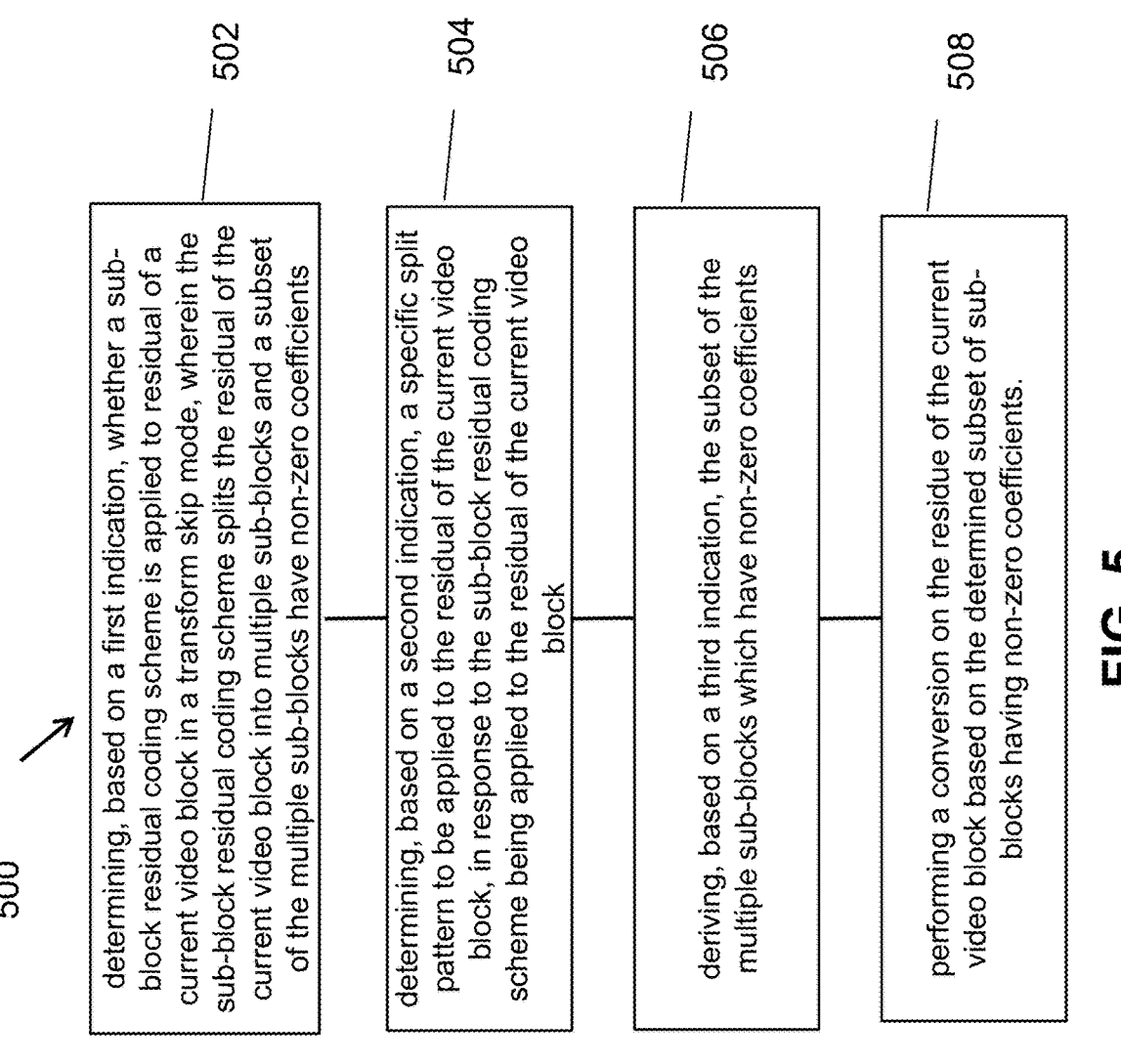

500

502 — determining, based on a first indication, whether a sub-block residual coding scheme is applied to residual of a current video block in a transform skip mode, wherein the sub-block residual coding scheme splits the residual of the current video block into multiple sub-blocks and a subset of the multiple sub-blocks have non-zero coefficients 504 — determining, based on a second indication, a specific split pattern to be applied to the residual of the current video block, in response to the sub-block residual coding scheme being applied to the residual of the current video block 506 — deriving, based on a third indication, the subset of the multiple sub-blocks which have non-zero coefficients 508 — performing a conversion on the residue of the current video block based on the determined subset of sub-blocks having non-zero coefficients.

FIG. 5

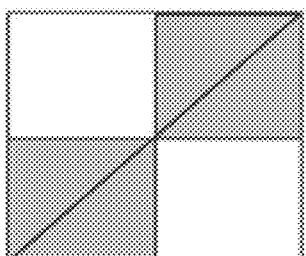
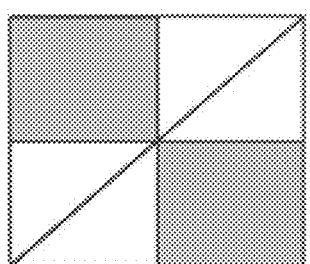
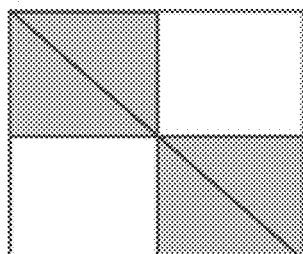
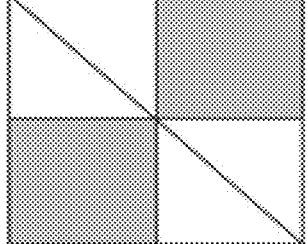
FIG. 6

SUB-BLOCK TRANSFORM IN TRANSFORM SKIP MODE

CROSS REFERENCE TO RELATED APPLICATIONS

This application is a continuation of International Patent Application No. PCT/CN2020/079245, filed on Mar. 13, 2020, which claims the priority to and benefit of International Patent Applications PCT/CN2019/077942, filed on Mar. 13, 2019, and PCT/CN2019/082428, filed on Apr. 12, 2019. All of the aforementioned patent applications are hereby incorporated by reference in their entireties.

TECHNICAL FIELD

This patent document relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Various techniques for using sub-block based transforms during encoding and decoding of digital video are disclosed.

In one example aspect, there is disclosed a method for video processing, comprising: determining, based on a first indication, whether a sub-block residual coding scheme is applied to residual of a current video block in a transform skip mode, wherein the sub-block residual coding scheme splits the residual of the current video block into multiple sub-blocks and a subset of the multiple sub-blocks have non-zero coefficients; determining, based on a second indication, a specific split pattern to be applied to the residual of the current video block, in response to the sub-block residual coding scheme being applied to the residual of the current video block; deriving, based on a third indication, the subset of the multiple sub-blocks which have non-zero coefficients; and performing a conversion on the residue of the current video block based on the determined subset of sub-blocks having non-zero coefficients.

In another example aspect, there is disclosed an apparatus in a video system comprising a processor and a non-transitory memory with instructions thereon, wherein the instructions upon execution by the processor, cause the processor to implement the method as described above.

In another example aspect, there is disclosed a non-transitory computer readable media, having program code stored thereupon, the program code, when executed, causing a processor to implement the method as described above.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIG. 5 is a flowchart for an example method of video processing.

FIG. 6 shows an example of a triangle partition used during conversion of a current video block.

DETAILED DESCRIPTION

Figure 1:
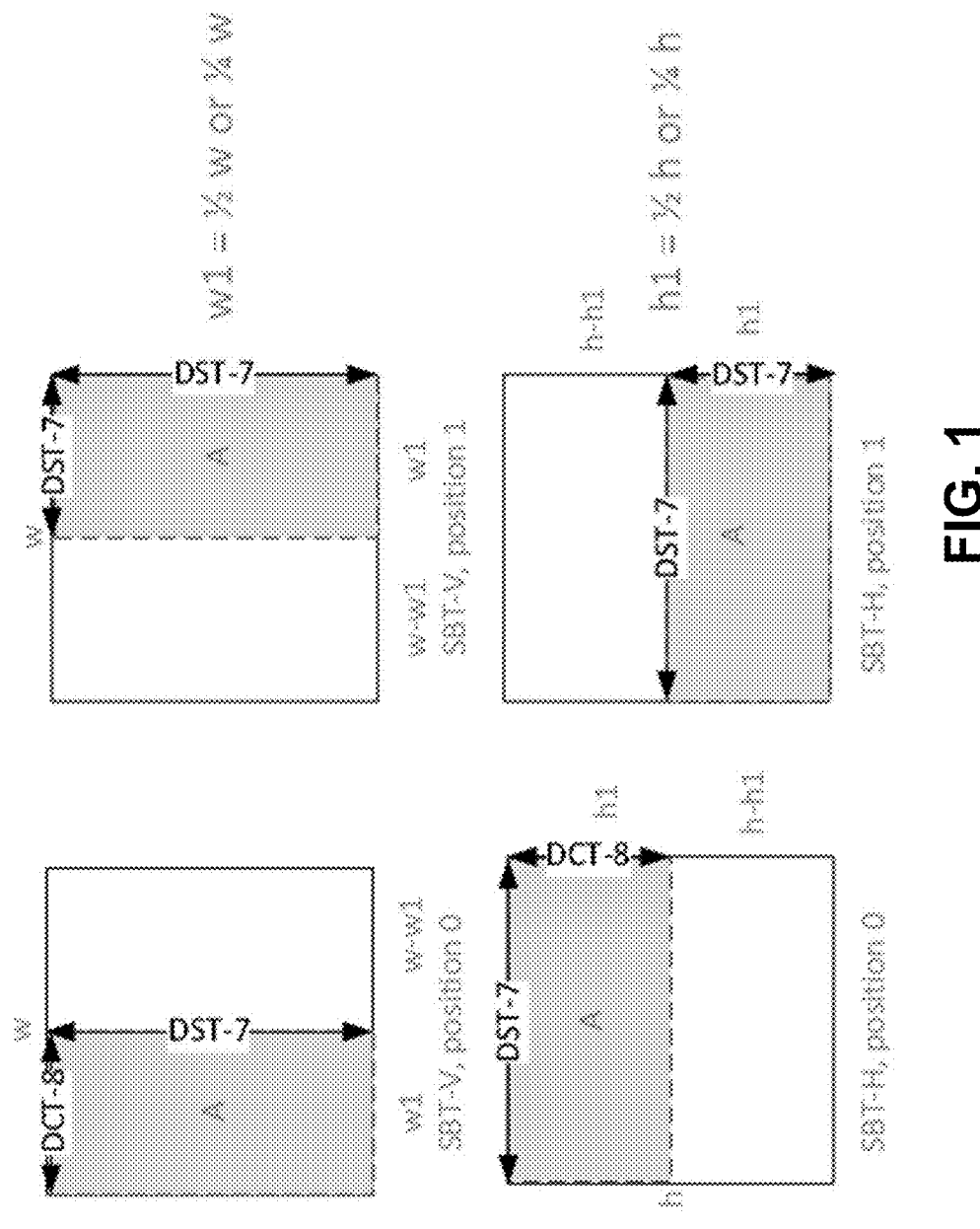
FIG. 1 shows an example illustration of sub-block transform (SBT) modes SBT-V and SBT-H.

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding (VVC) standard to be finalized, or other current and/or future video coding standards.

Embodiments of the disclosed technology may be applied to existing video coding standards (e.g., HEVC, H.265) and future standards to improve runtime performance. Section headings are used in the present document to improve readability of the description and do not in any way limit the discussion or the embodiments (and/or implementations) to the respective sections only.

1. Brief Summary

This invention is related to video coding technologies. Specifically, it is related to subblock transform in video coding, especially for screen content coding. It may be applied to the existing video coding standard like HEVC, or the standard (Versatile Video Coding) to be finalized. It may be also applicable to future video coding standards or video codec.

2. Initial Discussion

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1 Multiple Transform Selection (MTS)

In addition to DCT-II which has been employed in HEVC, a Multiple Transform Selection (MTS) scheme is used for residual coding both inter and intra coded blocks. It uses multiple selected transforms from the DCT8/DST7. The newly introduced transform matrices are DST-VII and DCT-VIII. Table 2-1 shows the basis functions of the selected DST/DCT.

TABLE 2-1

Transform basis functions of DCT-II/VIII and DSTVII for N-point input

| Transform Type | Basis function $T_i(j)$, i, j = 0, 1, . . . , N − 1 |
|---|---|
| DCT-II | $$T_i(j) = \omega_0 \cdot \sqrt{\frac{2}{N}} \cdot \cos\left(\frac{\pi \cdot i \cdot (2j+1)}{2N}\right)$$ where, $\omega_0 = \begin{cases} \sqrt{\frac{2}{N}} & i = 0 \\ 1 & i \neq 0 \end{cases}$ |
| DCT-VIII | $$T_i(j) = \sqrt{\frac{4}{2N+1}} \cdot \cos\left(\frac{\pi \cdot (2i+1) \cdot (2j+1)}{4N+2}\right)$$ |
| DST-VII | $$T_i(j) = \sqrt{\frac{4}{2N+1}} \cdot \sin\left(\frac{\pi \cdot (2i+1) \cdot (j+1)}{2N+1}\right)$$ |

In order to keep the orthogonality of the transform matrix, the transform matrices are quantized more accurately than the transform matrices in HEVC. To keep the intermediate values of the transformed coefficients within the 16-bit range, after horizontal and after vertical transform, all the coefficients are to have 10-bit.

In order to control MTS scheme, separate enabling flags are specified at SPS level for intra and inter, respectively. When MTS is enabled at SPS, a CU level flag is signalled to indicate whether MTS is applied or not. Here, MTS is applied only for luma. The MTS CU level flag is signalled when the following conditions are satisfied.

Both width and height smaller than or equal to 32

CBF flag is equal to one

If MTS CU flag is equal to zero, then DCT2 is applied in both directions. However, if MTS CU flag is equal to one, then two other flags are additionally signalled to indicate the transform type for the horizontal and vertical directions, respectively. Transform and signalling mapping table as shown in Table 2-2. When it comes to transform matrix precision, 8-bit primary transform cores are used. Therefore, all the transform cores used in HEVC are kept as the same, including 4-point DCT-2 and DST-7, 8-point, 16-point and 32-point DCT-2. Also, other transform cores including 64-point DCT-2, 4-point DCT-8, 8-point, 16-point, 32-point DST-7 and DCT-8, use 8-bit primary transform cores.

TABLE 2-2

Transform and signalling mapping table

| MTS_CU_flag | MTS_Hor_flag | MTS_Ver_flag | Intra/inter Horizontal | Vertical |
|---|---|---|---|---|
| 0 | | | DCT2 | |
| 1 | 0 | 0 | DST7 | DST7 |
| | 0 | 1 | DCT8 | DST7 |
| | 1 | 0 | DST7 | DCT8 |
| | 1 | 1 | DCT8 | DCT8 |

As in HEVC, the residual of a block can be coded with transform skip mode. To avoid the redundancy of syntax coding, the transform skip flag is not signalled when the CU level MTS_CU_flag is not equal to zero. Transform skip is enabled when both block width and height are equal to or less than 4.

2.2 Subblock Transform (SBT) in JVET-M0140

For an inter-predicted CU with cu_cbf equal to 1, cu_sbt_flag may be signaled to indicate whether the whole residual block or a sub-part of the residual block is decoded. In the former case, inter MTS information is further parsed to determine the transform type of the CU. In the latter case, a part of the residual block is coded with inferred adaptive transform and the other part of the residual block is zeroed out. The SBT is not applied to the combined inter-intra mode, since almost no coding gain is achieved.

2.2.1 Sub-Block TU Tiling

When SBT is used for a inter CU, SBT type and SBT position information are further decoded from the bitstream. There are two SBT types and two SBT positions, as indicated in FIG. 1. For SBT-V (or SBT-H), the TU width (or height) may equal to half of the CU width (or height) or ¼ of the CU width (or height), signaled by another flag, resulting in 2:2 split or 1:3/3:1 split. The 2:2 split is like a binary tree (BT) split while the 1:3/3:1 split is like an asymmetric binary tree (ABT) split. If one side of CU is 8 in luma samples, the 1:3/3:1 split along this side is not allowed. Hence, there are at most 8 SBT modes for a CU.

Figure 2:
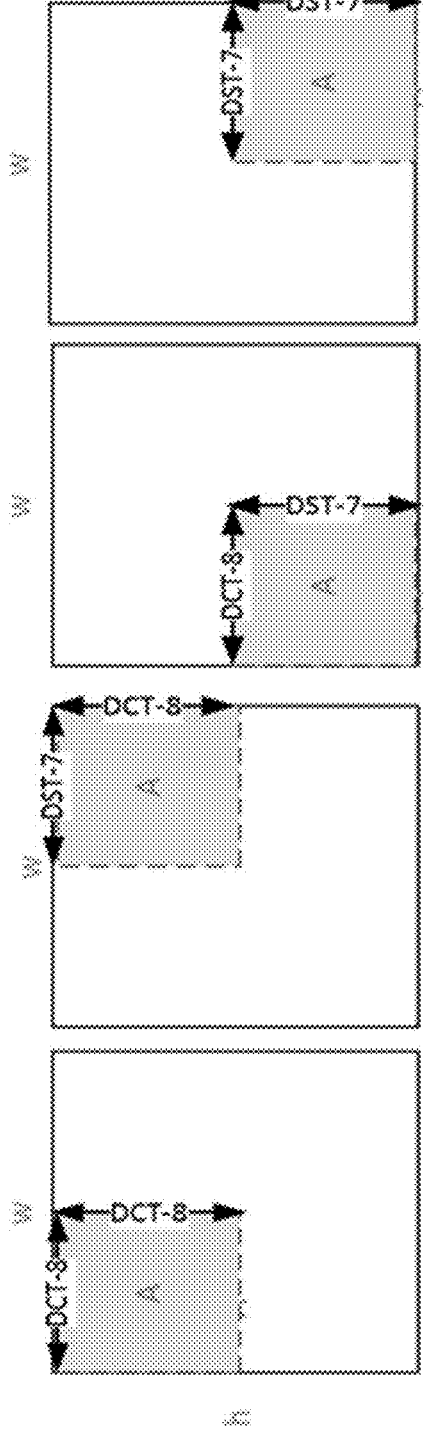
FIG. 2 shows an example Illustration of sub-block transform modes SBT-Q.

Quad-tree (QT) split is further used to tile one CU into 4 sub-blocks, and still one sub-block has residual, as shown in FIG. 2. This SBT type is denoted as SBT-Q.

SBT-V, SBT-H and SBT-Q are allowed for CU with width and height both no larger than maxSbtSize. The maxSbtSize is signaled in SPS. For HD and 4K sequences, maxSbtSize is set as 64 by encoder; for other smaller resolution sequences, maxSbtSize is set as 32.

2.2.2 Transform Type of the Sub-Block

Position-dependent transform is applied on luma transform blocks in SBT-V and SBT-H (chroma TB always using DCT-2). The two positions of SBT-H and SBT-V are associated with different core transforms. More specifically, the horizontal and vertical transforms for each SBT position is specified in FIG. 1. For example, the horizontal and vertical transforms for SBT-V position 0 is DCT-8 and DST-7, respectively. When one side of the residual TU is greater than 32, the corresponding transform is set as DCT-2. Therefore, the sub-block transform jointly specifies the TU tiling, cbf, and horizontal and vertical transforms of a residual block, which may be considered a syntax shortcut for the cases that the major residual of a block is at one side of the block.

FIG. 1 is an example illustration of sub-block transform modes SBT-V and SBT-H.

FIG. 2 is an example illustration of sub-block transform modes SBT-Q.

2.3 Subblock Transform in VVC

For an inter-predicted CU with cu_cbf equal to 1, i.e., with non-zero residual, cu_sbt_flag may be signaled to indicate whether the whole residual block or a sub-part of the residual block is decoded. In the former case, inter MTS information is further parsed to determine the transform type of the CU. In the latter case, a part of the residual block is coded with inferred adaptive transform and the other part of the residual block is zeroed out. The SBT is not applied to the combined inter-intra mode, since almost no coding gain is achieved.

When SBT is used for a inter CU, SBT type and SBT position information are further decoded from the bitstream. For SBT-V (or SBT-H), the TU width (or height) may equal to half of the CU width (or height) or ¼ of the CU width (or height), signaled by another flag, resulting in 2:2 split or 1:3/3:1 split. The 2:2 split is like a binary tree (BT) split while the 1:3/3:1 split is like an asymmetric binary tree (ABT) split. If one side of CU is 8 in luma samples, the 1:3/3:1 split along this side is not allowed. Hence, there are at most 8 SBT modes for a CU.

Position-dependent transform is applied on luma transform blocks in SBT-V and SBT-H (chroma TB always using DCT-2). The two positions of SBT-H and SBT-V are associated with different core transforms. More specifically, the horizontal and vertical transforms for each SBT position is specified in FIG. 1. For example, the horizontal and vertical transforms for SBT-V position 0 is DCT-8 and DST-7, respectively. When one side of the residual TU is greater than 32, the corresponding transform is set as DCT-2. Therefore, the sub-block transform jointly specifies the TU tiling, cbf, and horizontal and vertical transforms of a residual block, which may be considered a syntax shortcut for the cases that the major residual of a block is at one side of the block.

7.3.4.6 Coding Unit Syntax

|  | Descriptor |
|---|---|
| coding_unit( x0, y0, cbWidth, cbHeight, treeType ) { |  |
|   if( tile_group_type != I ) { |  |
|     if( treeType != DUAL_TREE_CHROMA ) |  |
|       cu_skip_flag[ x0 ][ y0 ] | ae(v) |
|     if( cu_skip_flag[ x0 ][ y0 ] = = 0 ) |  |
|       pred_mode_flag | ae(v) |
|   } |  |
|   if( CuPredMode[ x0 ][ y0 ] = = MODE_INTRA ) { |  |
|     if( sps_pcm_enabled_flag && |  |
|       cbWidth >= MinIpcmCbSizeY && cbWidth <= MaxIpcmCbSizeY && |  |
|       cbHeight >= MinIpcmCbSizeY && cbHeight <= MaxIpcmCbSizeY ) |  |
|       pcm_flag[ x0 ][ y0 ] | ae(v) |
|     if( pcm_flag[ x0 ][ y0 ] ) { |  |
|       while( !byte_aligned( ) ) |  |
|         pcm_alignment_zero_bit | f(1) |
|       pcm_sample( cbWidth, cbHeight, treeType) |  |
|     } else { |  |
|       if( treeType = = SINGLE_TREE \| \| treeType = = DUAL_TREE_LUMA ) { |  |
|         if( ( y0 % CtbSizeY ) > 0 ) |  |
|           intra_luma_ref_idx[ x0 ][ y0 ] | ae(v) |
|         if (intra_luma_ref idx[ x0 ][ y0 ] = = 0 && |  |
|           ( cbWidth <= MaxTbSizeY \| \| cbHeight <= MaxTbSizeY ) && |  |
|           ( cbWidth * cbHeight > MinTbSizeY * MinTbSizeY )) |  |
|           intra_subpartitions_mode_flag[ x0 ][ y0 ] | ae(v) |
|         if( intra_subpartitions_mode_flag[ x0 ][ y0 ] = = 1 && |  |
|           cbWidth <= MaxTbSizeY && cbHeight <= MaxTbSizeY ) |  |
|           intra_subpartitions_split_flag[ x0 ][ y0 ] | ae(v) |
|         if( intra_luma_ref_idx[ x0 ][ y0 ] = = 0 && |  |
|           intra_subpartitions_mode_flag[ x0 ][ y0 ] = = 0 ) |  |
|           intra_luma_mpm_flag[ x0 ][ y0 ] | ae(v) |
|         if( intra_luma_mpm_flag[ x0 ][ y0 ] ) |  |
|           intra_luma_mpm_idx[ x0 ][ y0 ] | ae(v) |
|         else |  |
|           intra_luma_mpm_remainder[ x0 ][ y0 ] | ae(v) |
|       } |  |
|       if( treeType = = SINGLE_TREE \| \| treeType = = DUAL_TREE_CHROMA ) |  |
|         intra_chroma_pred_mode[ x0 ][ y0 ] | ae(v) |
|     } |  |
|   } else if( treeType != DUAL_TREE_CHROMA ) { /* MODE_INTER */ |  |
|     if( cu_skip_flag[ x0 ][ y0 ] = = 0 ) |  |
|       merge_flag[ x0 ][ y0 ] | ae(v) |
|     if( merge_flag[ x0 ][ y0 ] ) { |  |
|       merge_data( x0, y0, cbWidth, cbHeight ) |  |
|     } else { |  |
|       if( tile_group_type = = B ) |  |
|         inter_pred_idc[ x0 ][ y0 ] | ae(v) |
|       if( sps_affine_enabled_flag && cbWidth >= 16 && cbHeight >= 16 ) { |  |
|         inter_affine_flag[ x0 ][ y0 ] | ae(v) |
|         if( sps_affine_type_flag && inter_affine_flag[ x0 ][ y0 ] ) |  |
|           cu_affine_type_flag[ x0 ][ y0 ] | ae(v) |
|       } |  |
|       if( inter_pred_idc[ x0 ][ y0 ] != PRED_L1 ) { |  |
|         if( num_ref_idx_l0_active_minus1 > 0 ) |  |

| | Descriptor |
|---|---|

```
          ref_idx_l0[ x0 ][ y0 ]                                              ae(v)
        mvd_coding( x0, y0, 0, 0 )
        if( MotionModelIdc[ x0 ][ y0 ] > 0 )
          mvd_coding( x0, y0, 0, 1 )
        if( MotionModelIdc[ x0 ][ y0 ] > 1 )
          mvd_coding( x0, y0, 0, 2 )
        mvp_l0_flag[ x0 ][ y0 ]                                               ae(v)
      } else {
        MvdL0[ x0 ][ y0 ][ 0 ] = 0
        MvdL0[ x0 ][ y0 ][ 1 ] = 0
      }
      if( inter_pred_idc[ x0 ][ y0 ] != PRED_L0 ) {
        if( num_ref_idx_l1_active_minus1 > 0 )
          ref_idx_l1[ x0 ][ y0 ]                                              ae(v)
        if( mvd_l1_zero_flag && inter_pred_idc[ x0 ][ y0 ] = = PRED_BI ) {
          MvdL1[ x0 ][ y0 ][ 0 ] = 0
          MvdL1[ x0 ][ y0 ][ 1 ] = 0
          MvdCpL1[ x0 ][ y0 ][ 0 ][ 0 ] = 0
          MvdCpL1[ x0 ][ y0 ][ 0 ][ 1 ] = 0
          MvdCpL1[ x0 ][ y0 ][ 1 ][ 0 ] = 0
          MvdCpL1[ x0 ][ y0 ][ 1 ][ 1 ] = 0
          MvdCpL1[ x0 ][ y0 ][ 2 ][ 0 ] = 0
          MvdCpL1[ x0 ][ y0 ][ 2 ][ 1 ] = 0
        } else {
          mvd_coding( x0, y0, 1, 0 )
          if( MotionModelIdc[ x0 ][ y0 ] > 0 )
            mvd_coding( x0, y0, 1, 1 )
          if(MotionModelIdc[ x0 ][ y0 ] > 1 )
            mvd_coding( x0, y0, 1, 2 )
          mvp_l1_flag[ x0 ][ y0 ]                                             ae(v)
      } else {
        MvdL1[ x0 ][ y0 ][ 0 ] = 0
        MvdL1[ x0 ][ y0 ][ 1 ] = 0
      }
      if( ( sps_amvr_enabled_flag && inter_affine_flag = = 0 &&
          ( MvdL0[ x0 ][ y0 ][ 0 ] != 0 | | MvdL0[ x0 ][ y0 ][ 1 ] != 0 | |
          MvdL1[ x0 ][ y0 ][ 0 ] != 0 | | MvdL1[ x0 ][ y0 ][ 1 ] != 0 ) ) | |
          ( sps_affine_amvr_enabled_flag && inter_affine_flag[ x0 ][ y0 ] = = 1 &&
          ( MvdCpL0[ x0 ][ y0 ][ 0 ][ 0 ] != 0 | | MvdCpL0[ x0 ][ y0 ][ 0 ][ 1 ] != 0 | |
          MvdCpL1[ x0 ][ y0 ][ 0 ][ 0 ] != 0 | | MvdCpL1[ x0 ][ y0 ][ 0 ][ 1 ] != 0 | |
          MvdCpL0[ x0 ][ y0 ][ 1 ][ 0 ] != 0 | | MvdCpL0[ x0 ][ y0 ][ 1 ][ 1 ] != 0 | |
          MvdCpL1[ x0 ][ y0 ][ 1 ][ 0 ] != 0 | | MvdCpL1[ x0 ][ y0 ][ 1 ][ 1 ] != 0 | |
          MvdCpL0[ x0 ][ y0 ][ 2 ][ 0 ] != 0 | | MvdCpL0[ x0 ][ y0 ][ 2 ][ 1 ] != 0 | |
          MvdCpL1[ x0 ][ y0 ][ 2 ][ 0 ] != 0 | | MvdCpL1[ x0 ][ y0 ][ 2 ][ 1 ] != 0 ) ) {
        if( !sps_cpr_enabled_flag | | !( inter_pred_idc[ x0 ][ y0 ] = = PRED_L0 &&
        ref_idx_l0[ x0 ][ y0 ] = = num_ref_idx_l0_active_minus1 ) )
          amvr_flag[ x0 ][ y0 ]                                               ae(v)
        if( amvr_flag[ x0 ][ y0 ] )
          amvr_precision_flag[ x0 ][ y0 ]                                     ae(v)
      }
      if( sps_gbi_enabled_flag && inter_pred_idc[ x0 ][ y0 ] = = PRED_BI &&
          cbWidth * cbHeight >= 256 )
        gbi_idx[ x0 ][ y0 ]                                                   ae(v)
    }
  }
  if( !pcm_flag[ x0 ][ y0 ] ) {
    if( CuPredMode[ x0 ][ y0 ] != MODE_INTRA && merge_flag[ x0 ][ y0 ] = = 0 )
      cu_cbf                                                                  ae(v)
    if( cu_cbf ) {
      if( CuPredMode[ x0 ][ y0 ] = = MODE_INTER && sps_sbt_enabled_flag &&
          !ciip_flag[ x0 ][ y0 ] ) {
        if( cbWidth <= MaxSbtSize && cbHeight <= MaxSbtSize ) {
          allowSbtVerH = cbWidth >= 8
          allowSbtVerQ = cbWidth >= 16
          allowSbtHorH = cbHeight >= 8
          allowSbtHorQ = cbHeight >= 16
          if( allowSbtVerH | | allowSbtHorH | | allowSbtVerQ | | allowSbtHorQ )
            cu_sbt_flag                                                       ae(v)
        }
        if( cu_sbt_flag ) {
          if( ( allowSbtVerH | | allowSbtHorH ) && ( allowSbtVerQ | | allowSbtHorQ) )
            cu_sbt_quad_flag                                                  ae(v)
          if( ( cu_sbt_quad_flag && allowSbtVerQ && allowSbtHorQ ) | |
            ( !cu_sbt_quad_flag && allowSbtVerH && allowSbtHorH ) )
```

-continued

| | Descriptor |
|---|---|
| cu_sbt_horizontal_flag | ae(v) |
| cu_sbt_pos_flag | ae(v) |
| } | |
| } | |
| } | |
| transform_tree( x0, y0, cbWidth, cbHeight, treeType ) | |
| } | |
| } | |
| } | |

7.3.4.10 Transform Tree Syntax

| | Descriptor |
|---|---|
| transform_tree( x0, y0, tbWidth, tbHeight, treeType) { | |
|   InferTuCbfLuma = 1 | |
|   if( IntraSubPartSplitType = = NO_ISP_SPLIT ) { | |
|     if( tbWidth > MaxTbSizeY \|\| tbHeight > MaxTbSizeY ) { | |
|       trafoWidth = ( tbWidth > MaxTbSizeY ) ? (tbWidth / 2) : tbWidth | |
|       trafoHeight = ( tbHeight > MaxTbSizeY ) ? (tbHeight / 2) : tbHeight | |
|       transform_tree( x0, y0, trafoWidth, trafoHeight) | |
|       if( tbWidth > MaxTbSizeY ) | |
|         transform_tree( x0 + trafoWidth, y0, trafoWidth, trafoHeight, treeType ) | |
|       if( tbHeight > MaxTbSizeY ) | |
|         transform_tree( x0, y0 + trafoHeight, trafoWidth, trafoHeight, treeType ) | |
|       if( tbWidth > MaxTbSizeY && tbHeight > MaxTbSizeY ) | |
|         transform_tree( x0 + trafoWidth, y0 + trafoHeight, trafoWidth, trafoHeight, treeType ) | |
|     } else { | |
|       transform_unit( x0, y0, tbWidth, tbHeight, treeType, 0 ) | |
|     } | |
|   } else if( cu_sbt_flag ) { | |
|     if( !cu_sbt_horizontal_flag ) { | |
|       trafoWidth = tbWidth * SbtNumFourthsTb0 / 4 | |
|       transform_unit( x0, y0, trafoWidth, tbHeight, treeType, 0 ) | |
|       transform_unit( x0 + trafoWidth, y0, tbWidth − trafoWidth, tbHeight, treeType, 1 ) | |
|     } else { | |
|       trafoHeight = tbHeight * SbtNumFourthsTb0 / 4 | |
|       transform_unit( x0, y0, tbWidth, trafoHeight, treeType, 0 ) | |
|       transform_unit( x0, y0 + trafoHeight, tbWidth, tbHeight − trafoHeight, treeType, 1 ) | |
|     } | |
|   } else if( IntraSubPartitionsSplitType = = ISP_HOR_SPLIT ) { | |
|     trafoHeight = tbHeight / NumIntraSubPartitions | |
|     for( partIdx = 0; partIdx < NumIntraSubPartitions; partIdx++ ) | |
|       transform_unit( x0, y0 + trafoHeight * partIdx, tbWidth, trafoHeight, treeType, partIdx ) | |
|   } else if( IntraSubPartitionsSplitType = = ISP_VER_SPLIT ) { | |
|     trafoWidth = tbWidth / NumIntraSubPartitions | |
|     for( partIdx = 0; partIdx < NumIntraSubPartitions; partIdx++ ) | |
|       transform_unit( x0 + trafoWidth * partIdx, y0, trafoWidth, tbHeight, treeType, partIdx ) | |
|   } | |
| } | |

7.3.4.11 Transform Unit Syntax

| | Descriptor |
|---|---|
| transform_unit( x0, y0, tbWidth, tbHeight, treeType, subTuIndex ) { | |
|   if( treeType = = SINGLE_TREE \|\| treeType = = DUAL_TREE_LUMA ) { | |
|     if( ( IntraSubPartitionsSplitType = = ISP_NO_SPLIT && !( cu_sbt_flag && | |
|       ( ( subTuIndex = = 0 && cu_sbt_pos_flag ) \|\| | |
|         ( subTuIndex = = 1 && !cu_sbt_pos_flag ) ) ) ) \|\| | |
|       ( IntraSubPartitionsSplitType != ISP_NO_SPLIT && | |
|       ( subTuIndex < NumIntraSubPartitions − 1 \|\| !InferTuCbfLuma ) ) ) | |
|       tu_cbf_luma[ x0 ][ y0 ] | ae(v) |
|     if (IntraSubPartitionsSplitType != ISP_NO_SPLIT ) | |
|       InferTuCbfLuma = InferTuCbfLuma && !tu_cbf_luma[ x0 ][ y0 ] | |
|   } | |
|   if( ( treeType = = SINGLE_TREE \|\| treeType = = DUAL_TREE_CHROMA ) { | |
|     if( ( IntraSubPartitionsSplitType = = ISP_NO_SPLIT && !( cu_sbt_flag && | |
|       ( ( subTuIndex = = 0 && cu_sbt_pos_flag ) \|\| | |
|         ( subTuIndex = = 1 && !cu_sbt_pos_flag ) ) ) ) \|\| | |
|       ( IntraSubPartitionsSplitType != ISP_NO_SPLIT && | |
|       ( subTuIndex = = NumIntraSubPartitions − 1 ) ) ) { | |

-continued

| | Descriptor |
|---|---|

```
            tu_cbf_cb[ x0 ][ y0 ]                                              ae(v)
            tu_cbf_cr[ x0 ][ y0 ]                                              ae(v)
        }
    }
    if( IntraSubPartitionsSplitType != ISP_NO_SPLIT &&
        treeType = = SINGLE_TREE && subTuIndex = = NumIntraSubPartitions − 1 ) )
        xC = CbPosX[ x0 ][ y0 ]
        yC = CbPosY[ x0 ][ y0 ]
        wC = CbWidth[ x0 ][ y0 ] / 2
        hC = CbHeight[ x0 ][ y0 ] / 2
    } else
        xC = x0
        yC = y0
        wC = tbWidth / SubWidthC
        hC = tbHeight / SubHeightC
    }
    if( ( tu_cbf_luma[ x0 ][ y0 ] | | tu_cbf_cb[ x0 ][ y0 ] | | tu_cbf_cr[ x0 ][ y0 ] ) &&
        treeType != DUAL_TREE_CHROMA ) {
        if( cu_qp_delta_enabled_flag && !IsCuQpDeltaCoded ) {
            cu_qp_delta_abs                                                    ae(v)
            if( cu_qp_delta_abs )
                cu_qp_delta_sign_flag                                          ae(v)
        }
    }
    if( tu_cbf_luma[ x0 ][ y0 ] && treeType != DUAL_TREE_CHROMA
        && ( tbWidth <= 32 ) && ( tbHeight <= 32 )
        && ( IntraSubPartitionsSplit[ x0 ][ y0 ] = = ISP_NO_SPLIT ) && ( !cu_sbt_flag ) ) {
        if( transform_skip_enabled_flag && tbWidth <= MaxTsSize && tbHeight <= MaxTsSize )
            transform_skip_flag[ x0 ][ y0 ]                                    ae(v)
        if( (( CuPredMode[ x0 ][ y0 ] = = MODE_INTER && sps_explicit_mts_inter_enabled_flag )
            | | ( CuPredMode[ x0 ][ y0 ] = = MODE_INTRA && sps_explicit_mts_intra_enabled_flag ))
            && ( tbWidth <= 32 ) && ( tbHeight <= 32 ) && ( !transform_skip_flag[ x0 ][ y0 ] ) )
            tu_mts_idx[ x0 ][ y0 ]                                             ae(v)
    }
    if( tu_cbf_luma[ x0 ][ y0 ] )
        residual_coding( x0, y0, Log2( tbWidth ), Log2( tbHeight ), 0 )
    if( tu_cbf_cb[ x0 ][ y0 ] )
        residual_coding( xC, yC, Log2( wC ), Log2( hC ), 1 )
    if( tu_cbf_cr[ x0 ][ y0 ] )
        residual_coding( xC, yC, Log2( wC ), Log2( hC ), 2 )
}
```

3. Example Problems Solved by the Disclosed Solutions

SBT have following problems:

1) In transform skip mode, SBT does not work.

2) In SBT, split direction, split position and which part of the CU has non-zero coefficients are signaled explicitly to the decoder, which may consume many bits.

3) SBT is disallowed on IBC mode or CIIP (combined intra-inter prediction) mode.

4. Examples of Techniques and Embodiments

To resolve above mentioned problems, several methods are described in this document. Suppose width and height of the block is W and H respectively.

The detailed inventions below should be considered as examples to explain general concepts. These inventions should not be interpreted in a narrow way. Furthermore, these inventions can be combined in any manner.

Figure 3:
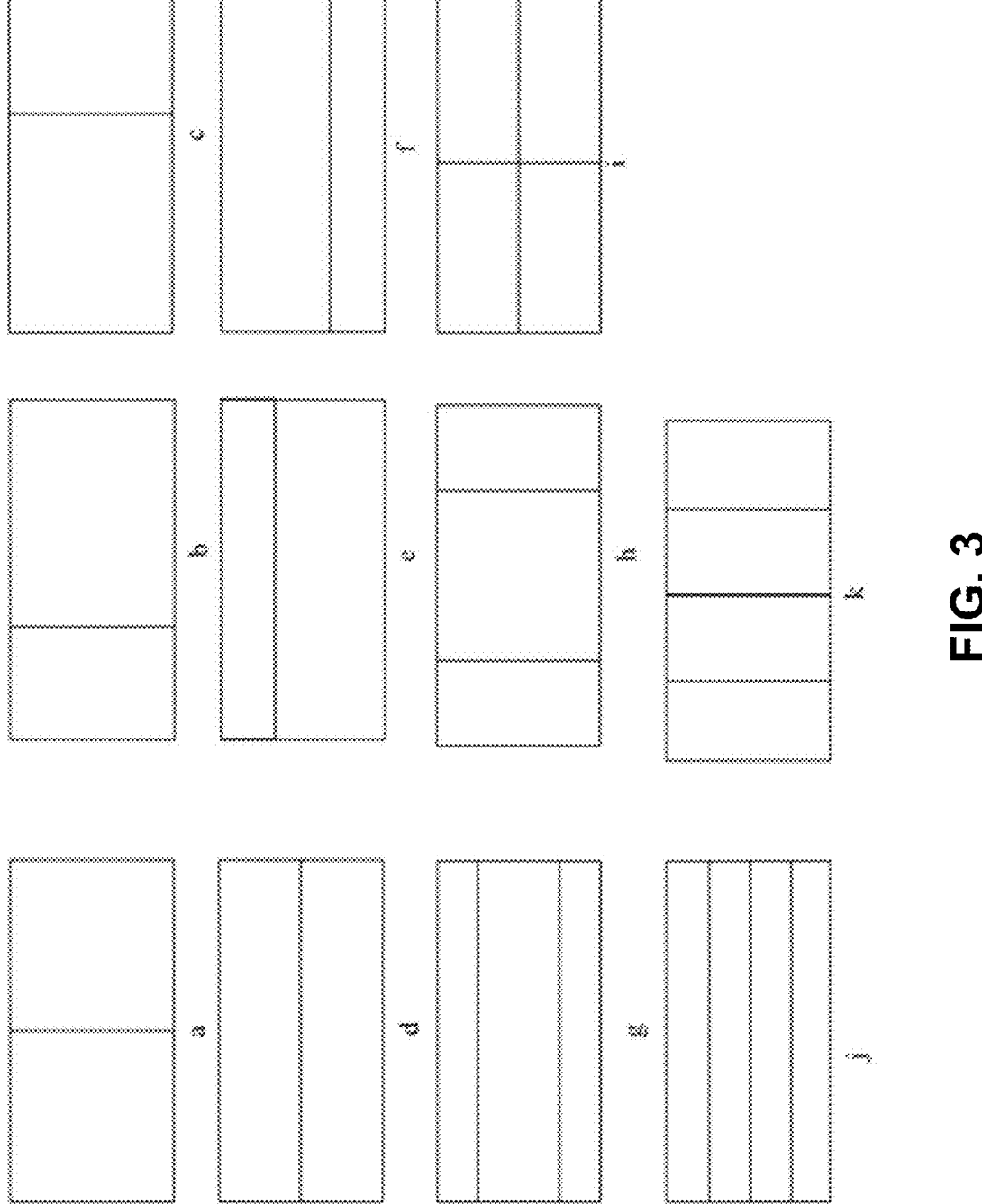
FIG. 3 shows examples of split patterns.

1. Residual of a block coded in transform skip mode may be split into N (N>1) subblocks, and only K (0<=K<=N) of the N subblocks are with non-zero coefficients.

a. In one example, the block may be split into 2 subblocks with size W/2*H or W*H/2, as shown in FIGS. 3 a and d.

b. In one example, the block may be split into 2 subblocks with size W/4*H or 3W/4*H, as shown in FIGS. 3 b and c.

c. In one example, the block may be split into 2 subblocks with size W*H/4 or W*3H/4, as shown in FIGS. 3 e and f.

d. In one example, the block may be split into 3 subblocks with size W*H/4, W*2H/4 and W*H/4, as shown in FIG. 3 h.

e. In one example, the block may be split into 3 subblocks with size W/4*H, 2W/4*H and W/4*H, as shown in FIG. 3 g.

f. In one example, the block may be split into 4 subblocks with size W/2*H/2, as shown in FIG. 3 i.

g. In one example, the block may be split into 4 subblocks with size W*H/4, as shown in FIG. 3 j.

h. In one example, the block may be split into 4 subblocks with size W/4*H, as shown in FIG. 3 k.

FIG. 3 shows examples of split patterns.

2. A flag may be signaled in VPS/SPS/PPS/tile group header/slice header/CU/block to indicate whether SBT in transform skip mode is employed or not.

a. In one example, CU/block level SBT flag may be coded with CABAC engine.

i. In one example, SBT flag of neighboring or/and non-adjacent blocks may be used to derive the context used in CABAC.

ii. Alternatively, one fixed context may be used in CABAC coding of SBT flag.

3. Which split pattern is used may be signaled explicitly to the decoder.

a. A first syntax element may be signaled to indicate whether the block is split into 2 subblock, 3 subblocks or 4 subblocks.

i. 2 bits may be required for the first syntax element if the block can be split into 2 subblock, 3 subblocks or 4 subblocks.

ii. Alternatively, if the block can only be split into 2 subblocks or 4 subblocks, only 1 bit is required.

iii. Alternatively, if the block can only be split into 2 subblocks or 3 subblocks, only 1 bit is required.

iv. Alternatively, if the block can only be split into 3 subblocks or 4 subblocks, only 1 bit is required.

v. More bits may be required if the block can be split 2, 3, . . . , N subblocks.

b. A second syntax element may be signaled to indicate whether the block is split vertically or horizontally.

i. Such syntax element may be not required for some patterns, for example, if the block is split into 4 subblocks with size W/2*H/2.

c. A third syntax element may be signaled to indicate the split position if the block is split into 2 subblocks.

i. If the current block can only be split into two same size subblocks, the third syntax element is not required.

4. Which subblocks have non-zero coefficients in transform skip mode may be signaled explicitly or predefined for some split patterns.

a. In one example, indices are explicitly signaled to indicate which subblocks have non-zero coefficients.

b. In one example, indices are explicitly signaled to indicate which subblocks have zero coefficients.

c. In one example, if the block is split into 2 subblocks with size W/4*H or 3W/4*H, the index may be not signaled and only the W/4*H subblock may have nonzero coefficients.

i. Alternatively, only the 3W/4*H subblock may have non-zero coefficients.

d. In one example, if the block is split into 2 subblocks with size W*H/4 or W*3H/4, the index may be not signaled and only the W*H/4 subblock may have non-zero coefficients.

i. Alternatively, only the W*3H/4 subblock may have non-zero coefficients.

e. In one example, if the block is split into 3 subblocks with size W/4*H, 2W/4*H and W/4*H, the index may be not signaled and only the 2W/4*H subblock may have non-zero coefficient.

f. In one example, if the block is split into 3 subblocks with size W*H/4, W*2H/4 and W*H/4, the index may be not signaled and only the W*2H/4 subblock may have non-zero coefficient.

5. Which subblocks have non-zero coefficients may be derived implicitly for some or all split patterns for SBT or/and SBT in transform skip mode.

a. In one example, spatial gradients are calculated for each subblock using its prediction samples, and the K (K>=1) subblocks with highest sum of absolute spatial gradient (SASG) may have non-zero coefficient.

b. In one example, for bi-directional predicted blocks, temporal gradients are calculated for each subblock using its prediction samples in both directions, and the K subblocks with highest sum of absolute temporal gradient (SATG) may have non-zero coefficient.

c. In one example, for bi-directional predicted blocks, both spatial and temporal gradients are calculated for each subblock, and the K subblocks with highest sum of absolute temporal and spatial gradient (SATSG) may have non-zero coefficient.

d. SASG may be calculated using gradients of horizonal direction or/and vertical direction or/and 45-degree diagonal direction or/and 135-degree diagonal direction.

e. SASG or/and SATG or/and SATSG may be calculated only for some prediction samples.

i. For example, SASG or/and SATG or/and SATSG may be calculated for the Mth (1<=M<=N) row of every N (N>=1) rows, e.g., M=1 and N=2.

6. Whether a split pattern in SBT or/and SBT in transform skip mode is valid for a block may depend on the block dimension or/and whether the block is at picture boundary or not.

a. In one example, if W<T (e.g., T=16), the block may be not split into subblocks with size W/4*H and 3W/4*H.

b. In one example, if W<T (e.g., T=16), the block may be not split into two W/2*H subblocks.

c. In one example, if W<T (e.g., T=16), the block may be not split into subblocks with size W/4*H, 2W/4*H and W/4*H.

d. In one example, if W<T (e.g., T=16), the block may be not split into four W/4*H subblocks.

e. In one example, if H<T (e.g., T=16), the block may be not split into subblocks with size W*H/4 and W*3H/4.

f. In one example, if H<T (e.g., T=16), the block may be not split into two W H/2 subblocks.

g. In one example, if H<T (e.g., T=16), the block may be not split into subblocks with size W*H/4, W*2H/4 and W*H/4.

h. In one example, if H<T (e.g., T=16), the block may be not split into four W H/4 subblocks.

i. In one example, if W<T1 or/and H<T2 (e.g., T1=T2=16), the block may be not split into four W/2*H/2 subblocks.

j. In one example, if W/H>T, horizontal split patterns or/and quad split pattern may be disallowed.

k. In one example, if H/W>T, vertical split patterns or/and quad split pattern may be disallowed.

l. T may be different for different split patterns.

m. In one example, if a block is at the right boundary or/and left boundary, horizontal split patterns may be disallowed.

n. In one example, if a block is at the right boundary or/and left boundary, vertical split patterns may be disallowed.

o. In one example, if a block is at the bottom boundary or/and top boundary, horizontal split patterns may be disallowed.

p. In one example, if a block is at the bottom boundary or/and top boundary, vertical split patterns may be disallowed.

q. Signaling of selected split pattern may depend on the number of allowed split patterns for a block.

i. For example, if there is only one allowed split pattern for a block, no bit is signaled to indicate the split pattern.

r. The constrains may depend on the coding information of the current and/or neighbouring blocks.

i. For example, T, T1 and T2 in the above bullets may be different when the current block is inter-coded or IBC-coded.

s. The constrains may depend on the color components.

i. For example, T, T1 and T2 in the above bullets may be different for the Y-component and Cb or Cr components.

t. The constrains may depend on the color formats.

i. For example, T, T1 and T2 in the above bullets may be different for 4:2:0 format and 4:4:4 format.

u. The constrains may depend on the color representations.

i. For example, T, T1 and T2 in the above bullets may be different for YCbCr color representation and RGB color representation.

7. It is proposed that there may be more than one transform regions in an SBT block.

a. FIG. 6 shows some examples where there are two transform regions in an SBT block.

8. Allowed split patterns m SBT or/and usage of SBT for blocks may depend on the motion information of the block.

a. In one example, usage of SBT for blocks and/or allowed split patterns in SBT may be decided according to the usage of illumination compensation.

i. In one example, when one block is coded with illumination compensation, SBT may be disabled.

b. In one example, allowed split patterns in SBT for blocks may depend on whether the block is coded in triangle mode or not and/or coded with transform skip mode or not.

c. In one example, binary split patterns in SBT may be disallowed for blocks coded with triangle mode, but other kinds of split patterns may be applied.

d. In one example, split patterns wherein half of each triangle PU is covered, e.g., split patterns illustrated in FIG. 6, may be allowed for blocks coded with triangle mode 9. Whether SBT or/and SBT in transform skip mode is allowed or not may depend on the motion information of the block.

a. In one example, if the block is coded in merge mode, SBT may be disallowed.

b. In one example, if the block is coded in merge mode and the merge index is smaller than or equal to N (for example, N=0), SBT may be disallowed.

c. In one example, if the block is coded in AMVP mode, SBT may be disallowed.

d. In one example, if the block is coded in affine mode, SBT may be disallowed.

e. In one example, if the block is coded in CIIP mode, SBT may be allowed.

f. In one example, if the block is coded in IBC mode, SBT may be allowed.

g. In one example, if the block is coded in weighted prediction mode, SBT may be disallowed.

h. In one example, if the block is coded with sub-block coded modes (such as ATMVP), SBT may be disallowed.

i. When SBT is allowed, the indication of usage of SBT may be signaled. On the contrary, when SBT is disallowed, signaling of the indication of usage of SBT is skipped.

10. Residual of a block may be split into M*N subblocks, e.g., 4*4 subblocks, and whether there is non-zero coefficient may be derived for each M*N subblock.

a. In one example, spatial gradients are calculated for each M*N subblock using its prediction samples, and subblocks with SASG>T may have non-zero coefficient.

b. In one example, for bi-directional predicted blocks, temporal gradients are calculated for each M*N subblock using its prediction samples in both directions, and subblocks with SATG>T may have non-zero coefficient.

c. In one example, for bi-directional predicted blocks, both spatial and temporal gradients are calculated for each M*N subblock, and subblocks with SASG>T1 or/and SATG>T2 or/and SASG+SATG>T3 may have non-zero coefficient.

d. SASG may be calculated using gradients of horizonal direction or/and vertical direction or/and 45-degree diagonal direction or/and 135-degree diagonal direction.

e. SASG or/and SATG or/and SATSG may be calculated only for some prediction samples.

i. For example, SASG or/and SATG or/and SATSG may be calculated for the Mth (1<=M<=N) row of every N (N>=1) rows, e.g., M=1 and N=2.

f. Alternatively, a W1*H1 region contains most such subblocks, i.e., subblocks satisfying above conditions, may have non-zero coefficient.

i. For example, W1=W/2 and H1=H/2.

ii. For example, W1=W/4 and H1=H.

iii. For example, W1=W/2 and H1=H.

iv. For example, W1=W and H1=H/2.

v. For example, W1=W and H1=H/4.

11. Residual of a block may be split into N subblocks, and K1 (K1>=0) subblocks are coded in transform skip mode, K2 (K2>=0) subblocks employ transform, and other subblocks have zero coefficient only.

a. In one example, index may be signaled for the K1 subblocks or/and the K2 subblocks.

b. In one example, which subblocks employ transform skip mode may be derived implicitly. For example, if the split pattern contains two subblocks, then subblock with larger SASG or SATG or SASG+SATG may be coded in transform skip mode, and the other subblock may employ transform.

12. Transform skip flag (e.g., transform_skip_flag) may be not signaled and derived implicitly.

a. In one example, if SASG>T1 or/and SATG>T2 or/and SASG+SATG>T3, the block may be coded in transform skip mode.

i. Alternatively, if SASG>T1 or/and SATG>T2 or/and SASG+SATG>T3, the block may employ transform.

b. In one example, whether transform skip flag is derived or not may depend on the mode or motion information of the block.

i. For example, transform skip flag may be derived in inter mode or/and intra block copy mode only.

ii. 11. For example, transform skip flag may be derived only when current block is bi-predicted only.

iii. For example, transform skip flag may be derived only when there are more than K non-zero coefficients.

c. In one example, transform skip may be disabled when there are less than K nonzero coefficients.

13. Secondary transform may be further applied to the blocks coded with SBT mode.

a. In one example, denote the block size by W*H, it may be firstly transformed by primary transform matrix (such as DCT-11), then the top-left W'*H' transformed region may be further transformed by other transform matrix wherein at least one of the conditions (W' unequal to W and H' unequal to H) is true.

14. Proposed method may be enabled according to the rule on block dimension.

a. In one example, proposed method may be enabled when W*H>=T1 && H>=T2. e.g. T1=64 and T2=8.

b. In one example, when a block size contains less than M*H samples, e.g., 32 or 64 luma samples, proposed method is not allowed.

c. In one example, when a block size contains more than M*H samples, e.g., 32 or 64 luma samples, proposed method is not allowed.

d. Alternatively, when minimum size of a block's width or/and height is smaller than or no larger than X, proposed method is not allowed. In one example, X is set to 8.

e. Alternatively, when a block's width>th1 or >=th1 and/or a block's height>th2 or >th2, proposed method is not allowed. In one example, X is set to 64.

i. For example, proposed method is disabled for M×M (e.g., 128×128) block.

ii. For example, proposed method is disabled for N×M/M×N block, e.g., wherein N>=64, M=128.

iii. For example, proposed method Is disabled for N×M/M×N block, e.g., wherein N>=4, M=128.

f. Alternatively, when a block's width<th1 or <=th1 and/or a block's height<th2 or <=th2, proposed method is not allowed. In one example, th1 and/or th2 is set to 8.

Figure 4:
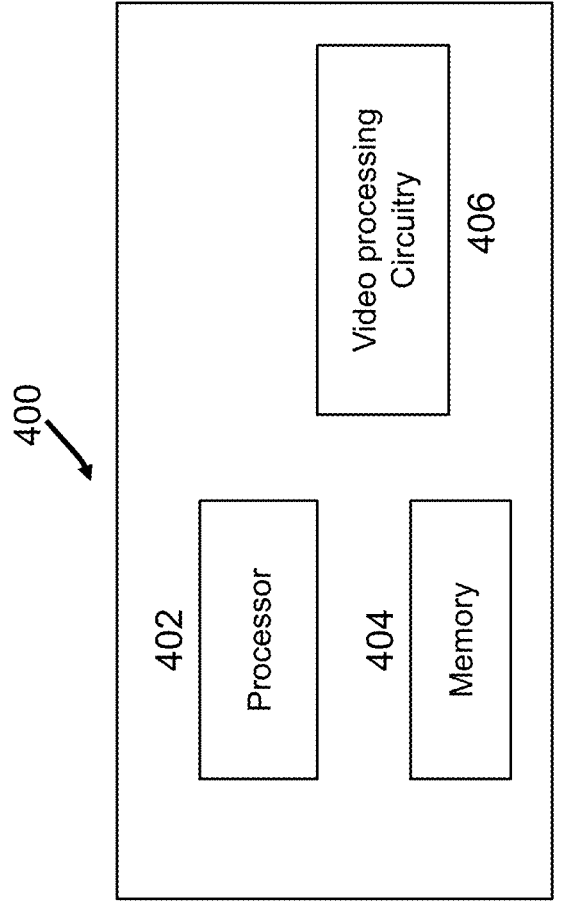
FIG. 4 is a block diagram of an example of a hardware platform for implementing a visual media decoding or a visual media encoding technique described in the present document.

FIG. 4 is a block diagram of a video processing apparatus 400. The apparatus 400 may be used to implement one or more of the methods described herein. The apparatus 400 may be embodied in a smartphone, tablet, computer, Internet of Things (IoT) receiver, and so on. The apparatus 400 may include one or more processors 402, one or more memories 404 and video processing hardware 406. The processor(s) 402 may be configured to implement one or more methods described in the present document. The memory (memories) 404 may be used for storing data and code used for implementing the methods and techniques described herein. The video processing hardware 406 may be used to implement, in hardware circuitry, some techniques described in the present document.

FIG. 5 is a flowchart for a method 500 of video processing. The method 500 includes determining (502), based on a first indication, whether a sub-block residual coding scheme is applied to residual of a current video block in a transform skip mode, wherein the sub-block residual coding scheme splits the residual of the current video block into multiple sub-blocks and a subset of the multiple sub-blocks have non-zero coefficients; determining (504), based on a second indication, a specific split pattern to be applied to the residual of the current video block, in response to the sub-block residual coding scheme being applied to the residual of the current video block; deriving (506), based on a third indication, the subset of the multiple sub-blocks which have non-zero coefficients; and performing a conversion (508) on the residue of the current video block based on the determined subset of sub-blocks having non-zero coefficients.

The following clauses, along with the listing in Section 4, provide additional embodiments and examples of the disclosed technology.

In one aspect, there is disclosed a method for video processing, comprising:

determining, based on a first indication, whether a sub-block residual coding scheme is applied to residual of a current video block in a transform skip mode, wherein the sub-block residual coding scheme splits the residual of the current video block into multiple sub-blocks and a subset of the multiple sub-blocks have non-zero coefficients;

determining, based on a second indication, a specific split pattern to be applied to the residual of the current video block, in response to the sub-block residual coding scheme being applied to the residual of the current video block;

deriving, based on a third indication, the subset of the multiple sub-blocks which have non-zero coefficients; and performing a conversion on the residue of the current video block based on the determined subset of sub-blocks having non-zero coefficients.

In one example, the first indication is a flag signaled in at least one of a sequence parameter set (SPS), a video parameter set (VPS), a picture parameter set (PPS), a slice header, a tile group header, a coding unit (CU) level, and a block level.

In one example, the first flag signaled in the CU level or in the block level is coded in a context used in a context-based adaptive binary arithmetic coding (CABAC) engine.

In one example, the context is derived from the first flag of at least one neighboring block.

In one example, the at least one neighboring block comprises at least one of an adjacent block and a non-adjacent block.

In one example, the context is predefined.

In one example, whether the first indication is signaled depends on motion information of the current video block.

In one example, the first indication is not signaled if the current video block is coded with one of modes as follows:

a merge mode;

an advanced motion vector prediction (AMVP) mode;

an affine mode;

a combined intra-inter prediction (CIIP) mode;

an intra block copy (IBC) mode;

a weighed prediction mode; and a sub-block based MVP mode.

In one example, the sub-block based MVP mode comprises an alternative temporal motion vector prediction (ATMVP) mode.

In one example, the current video block is coded with the merge mode and a merge index associate therewith is not more than a threshold T.

In one example, T=0.

In one example, the first indication is not signaled if the sub-block residual coding scheme is not allowed for the residual of the current video block.

In one example, the sub-block residual coding scheme is not allowed for the residual of the current video block if the current video block is coded with illumination compensation (IC).

In one example, the second indication is determined from at least one syntax element signaled from an encoding side to a decoding side.

In one example, the at least one syntax element comprises a first syntax element which indicates an amount of the sub-blocks to be split from the residual of current video block.

In one example, the first syntax element comprises one or multiple bins, and an amount of the one or multiple bins as required depends on the specific split pattern allowed for the residual of current video block.

In one example, two bins are required if the residual of current video block is allowed to be split into two, three or four sub-blocks.

In one example, only one bin is required if the residual of current video block is only allowed to be split into two or three sub-blocks, or into three or four sub-blocks, or into two or four sub-blocks.

In one example, the at least one syntax element further comprises a second syntax element based on the specific split pattern, the second syntax element indicating a direction in which the residual of current video block is split into the multiple sub-blocks.

In one example, no second syntax element is required if the specific split pattern specifies that the residual of current video block is split into four sub-blocks with a same size of W/2*H/2.

In one example, the at least one syntax element further comprises a third syntax element based on the specific split pattern, the third syntax element indicates a split position at which the residual of current video block is split into two sub-blocks.

In one example, no third syntax element is required if the residual of current video block is only allowed to be split into two sub-blocks with a same size.

In one example, the second indication depends on a block dimension of the current video block.

In one example, if W<T1, the second indication indicates the specific split pattern excludes that the current video block is split into the sub-blocks with sizes of one of the following:
{W/4*H, 3W/4*H};
{3W/4*H, W/4*H};
{W/2*H, W/2*H};
{W/4*H, W/2*H, W/4*H};
{W/4*H, W/4*H, W/4*H, W/4*H}; and
{W/2*H/2, W/2*H/2, W/2*H/2, W/2*H/2},
W and H representing a width and height of the current video block respectively, T1 representing a first threshold.

In one example, T1=16.

In one example, if H<T2, the second indication indicates the specific split pattern excludes that the current video block is split into the sub-blocks with sizes of one of the following:
{W*H/4, W*3H/4};
{W*3H/4, W*H/4};
{W*H/2, W*H/2};
{W*H/4, W*H/2, W*H/4};
{W*H/4, W*H/4, W*H/4, W*H/4}; and
{W/2*H/2, W/2*H/2, W/2*H/2, W/2*H/2},
H and W representing a height and width of the current video block, T2 representing a second threshold.

In one example, T2=16.

In one example, if W/H>T3, the second indication indicates the specific split pattern excludes that the current video block is split in a horizontal direction, W and H representing a width and height of the current video block respectively, T3 representing a third threshold.

In one example, if H/W>T4, the second indication indicates the specific split pattern excludes that the current video block is split in a vertical direction, W and H representing a width and height of the current video block respectively, T3 representing a third threshold.

In one example, the second indication depends on a position of the current video block.

In one example, if the current video block is one of right boundary, left boundary, bottom boundary or top boundary, the second indication indicates the specific split pattern excludes that the current video block is split in at least one of a vertical direction and a horizontal direction.

In one example, whether the second indication is signaled depends on an amount of a split pattern allowable for the residual of the current video block.

In one example, no signaling is used for the second indication if only one split pattern is allowable for the residual of the current video block.

In one example, at least one of thresholds depends on at least one of the following:
the specific split pattern applicable to the current video block;
coding information of the current video block or at least one neighboring block;
color components of the current video block;
a color format of the current video block; and
a color representation of the current video block.

In one example, at least one of the thresholds differs between an inter-coding mode and Intra block copy (IBC) coding mode applicable to the current video block.

In one example, at least one of the thresholds differs between a luma component Y and chroma components Cb/Cr.

In one example, at least one of the thresholds differs between 4:2:0 color format and 4:4:4 color format.

In one example, at least one of the thresholds differs between YCbCr color representation and RGB color representation.

In one example, at least one of the thresholds differs between different split patterns.

In one example, the second indication depends on motion information of the current video block.

In one example, the second indication indicates which specific split pattern is allowable for the residual of the current video block if the current video block is coded with a triangle prediction mode.

In one example, the specific split pattern excludes a binary split pattern if the current video block is coded with the triangle prediction mode.

In one example, if the current video block is coded with the triangle prediction mode, the specific splitting pattern specifies that each of two triangle prediction units is split into one rectangular portion and two triangular portions, and the two triangular portions have a same size which is equal to a half of the one rectangular portion.

In one example, the current video block has one or more rectangular transform regions with non-zero coefficients.

In one example, the current video block has two rectangular transform regions each covering the one rectangular portion within each triangle prediction unit.

In one example, the current video block has two rectangular transform regions each covering one triangular portion within one triangle prediction unit and one triangular portion within another triangle prediction unit.

In one example, the third indication is determined from an index or predefined based on the specific split pattern.

In one example, the index is signaled for indicating each of the sub-blocks with the non-zero coefficients in the transform skip mode.

In one example, the index is signaled for indicating each of the sub-blocks with zero coefficients in the transform skip mode.

In one example, if the specific split pattern specifies that the residual of the current video block is split into two sub-blocks with different sizes, only one of two sub-blocks has non-zero coefficients and no index is signaled for indicating which sub-block has non-zero coefficients.

In one example, the two sub-block have sizes W/4*H and 3W/4*H respectively, or the two sub-block have sizes W*H/4, W*3H/4 respectively.

In one example, if the specific split pattern specifies that the residual of the current video block is split into three sub-blocks and one of the three sub-blocks has a first size different from the other two of the three sub-blocks with a second size, said one of the three sub-blocks with the first size has non-zero coefficients and no index is signaled for indicating which sub-block has non-zero coefficients.

In one example, the first size is W/2*H and the second size is W/4*H, or the first size is W*H/2 and the second size is W*H/4.

In one example, the third indication depends on characteristic associated with the sub-blocks.

In one example, the characteristic associated with the sub-blocks comprises spatial gradients of the sub-blocks; and wherein spatial gradients are calculated for each of the multiple sub-blocks based on prediction samples associated with each sub-block, and the third indication indicates that the set of the multiple sub-blocks with highest sum of absolute spatial gradient (SASG) have non-zero coefficients.

In one example, if the current video block is a bi-directional predicted block, the characteristic associated with the sub-blocks comprises temporal gradients of the sub-blocks.

In one example, temporal gradients are calculated for each of the N sub-blocks based on prediction samples associated with each sub-block in both directions, and the third indication indicates that the set of the multiple sub-blocks with highest sum of absolute temporal gradient (SATG) have non-zero coefficients.

In one example, the characteristic associated with the sub-blocks further comprises spatial gradients of the sub-blocks; and both spatial and temporal gradients are calculated for each of the N sub-blocks based on prediction samples associated with each sub-block in both directions, and the third indication indicates that the set of the multiple sub-blocks with highest sum of absolute temporal and spatial gradient (SATSG) have non-zero coefficients.

In one example, the highest sum of absolute spatial gradient (SASG) are calculated for each of the sub-blocks by using the spatial gradients in a specific direction.

In one example, the specific direction comprises one of a horizontal direction, a vertical direction, a 45-degree diagonal direction and a 135-degree diagonal direction.

In one example, the prediction samples associated with each sub-block are located at specific positions.

In one example, the specific positions comprise $P^{th}$ row of every Q rows.

In one example, P=1 and Q=2.

In one example, the residue of the current video block is split into two sub-blocks vertically or horizontally in the specific split pattern.

In one example, the two sub-blocks have sizes as follows:
{W/2*H, W/2*H};
{W/4*H, 3W/4*H}; or
{3W/4*H, W/4*H},
   wherein W and H represent width and height of the current video block respectively.

In one example, the two sub-blocks have sizes as follows:
{W*H/2, W*H/2};
{W*H/4, W*3H/4}; or
{W*3H/4, W*H/4},
   wherein W and H represent width and height of the current video block respectively.

In one example, the residual of the current video block is split into three sub-blocks vertically or horizontally in the specific split pattern.

In one example, the three sub-blocks have sizes as follows:
{W/4*H, W/2*H, W/4*H},
   wherein W and H represent width and height of the current video block respectively.

In one example, the three sub-blocks have sizes as follows:
{W*H/4, W*H/2, W*H/4},
   wherein W and H represent width and height of the current video block respectively.

In one example, the residual of the current video block is split into four sub-blocks vertically and/or horizontally in the specific split pattern.

In one example, each of the four sub-blocks has a size of W/4*H, wherein W and H represent width and height of the current video block respectively.

In one example, each of the four sub-blocks has a size of W*H/4, wherein W and H represent width and height of the current video block respectively.

In one example, each of the four sub-blocks has a size of W/2*H/2, wherein W and H represent width and height of the current video block respectively.

In one example, the conversion includes encoding the current video block into the bitstream representation of a video and decoding the current video block from the bitstream representation of the video.

In yet another aspect, there is disclosed an apparatus in a video system comprising a processor and a non-transitory memory with instructions thereon, wherein the instructions upon execution by the processor, cause the processor to implement the method as described above.

In yet another aspect, there is disclosed a non-transitory computer readable media, having program code stored thereupon, the program code, when executed, causing a processor to implement the method as described above.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, comprising:

determining whether a sub-block residual coding scheme is applied to residual of a current video block of a video based on a block dimension of the current video block, wherein the current video block is coded in a transform skip mode, in the transform skip mode, a transform is skipped on a prediction residual between the current video block and a reference video block, and the sub-block residual coding scheme splits the residual of the current video block into multiple sub-blocks and a subset of the multiple sub-blocks has non-zero coefficients;

determining a specific split pattern to be applied to the residual of the current video block, in response to the sub-block residual coding scheme being applied to the residual of the current video block;

deriving the subset of the multiple sub-blocks which has non-zero coefficients; and performing a conversion between the current video block and a bitstream of the video based on the subset of the multiple sub-blocks having non-zero coefficients, wherein a first flag indicating whether the sub-block residual coding scheme is enabled is included in at least one of a sequence parameter set (SPS), a video parameter set (VPS), a picture parameter set (PPS), a slice header, a tile group header, a coding unit (CU) level, or a block level, wherein the first flag included in the CU level or in the block level is coded with a context-based adaptive binary arithmetic coding (CABAC) engine, wherein the subset of the multiple sub-blocks which has non-zero coefficients is derived implicitly, and wherein the sub-block residual coding scheme is not allowed in response to a width of the current video block being smaller than threshold 5 (th5) and a height of the current video block being smaller than threshold 6 (th6), wherein th5=th6=8.

2. The method of claim 1, wherein one of the sub-blocks of the residual of the current video block has a size of one of the following: W/2*H, W*H/2, W/4*H or W*H/4, W and H representing a width and height of the current video block respectively.

3. The method of claim 1, wherein multiple syntax elements are included in the bitstream to indicate the specific split pattern applied to the residual of current video block.

4. The method of claim 3, wherein the multiple syntax elements comprise a first syntax element which indicates whether a first split pattern in which a size of one of the sub-blocks is ½ size of the current video block or a second split pattern in which a size of one of the sub-blocks is ¼ size of the current video block is applied.

5. The method of claim 3, wherein the multiple syntax elements comprise a second syntax element which indicates a direction in which the residual of current video block is split into the multiple sub-blocks, wherein the direction comprises one of a horizontal direction or a vertical direction.

6. The method of claim 1, wherein K1 sub-blocks of the subset of the multiple sub-blocks which has non-zero coefficients are coded in a transform skip mode, and K2 sub-blocks of the subset of the multiple sub-blocks which has non-zero coefficients employ a transform, wherein K1>=0 and K2>=0.

7. The method of claim 6, wherein the K2 sub-blocks of the subset of the multiple sub-blocks which has non-zero coefficients which employ the transform are derived implicitly.

8. The method of claim 1, wherein a fourth syntax element indicating whether the transform skip mode is applied to the current video block is included in the bitstream, or a determination of the transform skip mode being applied to the current video block is derived implicitly.

9. The method of claim 1, wherein the conversion includes encoding the current video block into the bitstream.

10. The method of claim 1, wherein the conversion includes decoding the current video block from the bitstream.

11. An apparatus for processing video data comprising a processor and a non-transitory memory with instructions thereon, wherein the instructions upon execution by the processor, cause the processor to:

determine whether a sub-block residual coding scheme is applied to residual of a current video block of a video based on a block dimension of the current video block, wherein the current video block is coded in a transform skip mode, in the transform skip mode, a transform is skipped on a prediction residual between the current video block and a reference video block, and the sub-block residual coding scheme splits the residual of the current video block into multiple sub-blocks and a subset of the multiple sub-blocks has non-zero coefficients;

determine a specific split pattern to be applied to the residual of the current video block, in response to the sub-block residual coding scheme being applied to the residual of the current video block;

derive the subset of the multiple sub-blocks which has non-zero coefficients; and perform a conversion between the current video block and a bitstream of the video based on the subset of the multiple sub-blocks having non-zero coefficients, wherein a first flag indicating whether the sub-block residual coding scheme is enabled is included in at least one of a sequence parameter set (SPS), a video parameter set (VPS), a picture parameter set (PPS), a slice header, a tile group header, a coding unit (CU) level, or a block level, wherein the first flag included in the CU level or in the block level is coded with a context-based adaptive binary arithmetic coding (CABAC) engine, wherein the subset of the multiple sub-blocks which has non-zero coefficients is derived implicitly, and wherein the sub-block residual coding scheme is not allowed in response to a width of the current video block being smaller than threshold 5 (th5) and a height of the current video block being smaller than threshold 6 (th6), wherein th5-th6-8.

12. The apparatus of claim 11, wherein one of the sub-blocks of the residual of the current video block has a size of one of the following: W/2*H, W*H/2, W/4*H or W*H/4, W and H representing a width and height of the current video block respectively, wherein multiple syntax elements are included in the bitstream to indicate the specific split pattern applied to the residual of current video block, wherein the multiple syntax elements comprise a first syntax element which indicates whether a first split pattern in which a size of one of the sub-blocks is ½ size of the current video block or a second split pattern in which a size of one of the sub-blocks is ¼ size of the current video block is applied, and wherein the multiple syntax elements comprise a second syntax element which indicates a direction in which the residual of current video block is split into the multiple sub-blocks, wherein the direction comprises one of a horizontal direction or a vertical direction.

13. A non-transitory computer-readable storage medium storing instructions that cause a processor to:

determine whether a sub-block residual coding scheme is applied to residual of a current video block of a video based on a block dimension of the current video block, wherein the current video block is coded in a transform skip mode, in the transform skip mode, a transform is skipped on a prediction residual between the current video block and a reference video block, and the sub-block residual coding scheme splits the residual of the current video block into multiple sub-blocks and a subset of the multiple sub-blocks has non-zero coefficients;

determine a specific split pattern to be applied to the residual of the current video block, in response to the sub-block residual coding scheme being applied to the residual of the current video block;

derive the subset of the multiple sub-blocks which has non-zero coefficients; and perform a conversion between the current video block and a bitstream of the video based on the subset of the multiple sub-blocks having non-zero coefficients, wherein a first flag indicating whether the sub-block residual coding scheme is enabled is included in at least one of a sequence parameter set (SPS), a video parameter set (VPS), a picture parameter set (PPS), a slice header, a tile group header, a coding unit (CU) level, or a block level, wherein the first flag included in the CU level or in the block level is coded with a context-based adaptive binary arithmetic coding (CABAC) engine, wherein the subset of the multiple sub-blocks which has non-zero coefficients is derived implicitly, and wherein the sub-block residual coding scheme is not allowed in response to a width of the current video block being smaller than threshold 5 (th5) and a height of the current video block being smaller than threshold 6 (th6), wherein th5=th6=8.

14. The non-transitory computer-readable storage medium of claim 13, wherein one of the sub-blocks of the residual of the current video block has a size of one of the following: W/2*H, W*H/2, W/4*H or W*H/4, W and H representing a width and height of the current video block respectively, wherein multiple syntax elements are included in the bitstream to indicate the specific split pattern applied to the residual of current video block, wherein the multiple syntax elements comprise a first syntax element which indicates whether a first split pattern in which a size of one of the sub-blocks is ½ size of the current video block or a second split pattern in which a size of one of the sub-blocks is ¼ size of the current video block is applied, and wherein the multiple syntax elements comprise a second syntax element which indicates a direction in which the residual of current video block is split into the multiple sub-blocks, wherein the direction comprises one of a horizontal direction or a vertical direction.

15. A non-transitory computer-readable recording medium storing a bitstream of a video which is generated by a method performed by a video processing apparatus, wherein the method comprises:

determining whether a sub-block residual coding scheme is applied to residual of a current video block of the video based on a block dimension of the current video block, wherein the current video block is coded in a transform skip mode, in the transform skip mode, a transform is skipped on a prediction residual between the current video block and a reference video block, and the sub-block residual coding scheme splits the residual of the current video block into multiple sub-blocks and a subset of the multiple sub-blocks has non-zero coefficients;

determining a specific split pattern to be applied to the residual of the current video block, in response to the sub-block residual coding scheme being applied to the residual of the current video block;

deriving the subset of the multiple sub-blocks which has non-zero coefficients; and generating the bitstream based on the subset of the multiple sub-blocks having non-zero coefficients, wherein a first flag indicating whether the sub-block residual coding scheme is enabled is included in at least one of a sequence parameter set (SPS), a video parameter set (VPS), a picture parameter set (PPS), a slice header, a tile group header, a coding unit (CU) level, or a block level, wherein the first flag included in the CU level or in the block level is coded with a context-based adaptive binary arithmetic coding (CABAC) engine, wherein the subset of the multiple sub-blocks which has non-zero coefficients is derived implicitly, and wherein the sub-block residual coding scheme is not allowed in response to a width of the current video block being smaller than threshold 5 (th5) and a height of the current video block being smaller than threshold 6 (th6), wherein th5=th6=8.

16. The apparatus of claim 11, wherein K1 sub-blocks of the subset of the multiple sub-blocks which has non-zero coefficients are coded in a transform skip mode, and K2 sub-blocks of the subset of the multiple sub-blocks which has non-zero coefficients employ a transform, wherein K1>=0 and K2>=0, and wherein the K2 sub-blocks of the subset of the multiple sub-blocks which has non-zero coefficients which employ the transform are derived implicitly.

17. The non-transitory computer-readable storage medium of claim 13, wherein K1 sub-blocks of the subset of the multiple sub-blocks which has non-zero coefficients are coded in a transform skip mode, and K2 sub-blocks of the subset of the multiple sub-blocks which has non-zero coefficients employ a transform, wherein K1>=0 and K2>=0, and wherein the K2 sub-blocks of the subset of the multiple sub-blocks which has non-zero coefficients which employ the transform are derived implicitly.

18. The non-transitory computer-readable recording medium of claim 15, wherein K1 sub-blocks of the subset of the multiple sub-blocks which has non-zero coefficients are coded in a transform skip mode, and K2 sub-blocks of the subset of the multiple sub-blocks which has non-zero coefficients employ a transform, wherein K1>=0 and K2>=0, and wherein the K2 sub-blocks of the subset of the multiple sub-blocks which has non-zero coefficients which employ the transform are derived implicitly.

* * * * *